(12) United States Patent
Chikaraishi

(10) Patent No.: US 7,275,451 B2
(45) Date of Patent: Oct. 2, 2007

(54) ELECTRIC POWER STEERING DEVICE

(75) Inventor: Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 114 days.

(21) Appl. No.: 11/028,071

(22) Filed: Jan. 4, 2005

(65) Prior Publication Data

US 2005/0155811 A1  Jul. 21, 2005

Related U.S. Application Data

(63) Continuation-in-part of application No. PCT/JP03/006306, filed on May 21, 2003.

(30) Foreign Application Priority Data

Jul. 5, 2002  (JP)  ............................. 2002-197994

(51) Int. Cl.
*G01L 3/00* (2006.01)

(52) U.S. Cl. ..................... 73/862.331; 73/862.336; 180/443; 180/444; 439/733.1; 439/735; 439/206

(58) Field of Classification Search ................ 180/443, 180/444; 73/862.331–862.336; 439/733.1, 439/735, 206

See application file for complete search history.

(56) References Cited

U.S. PATENT DOCUMENTS

| | | |
|---|---|---|
| 4,461,195 A | 7/1984 | Barnick |
| 5,358,420 A | 10/1994 | Cairns et al. |
| 5,885,113 A * | 3/1999 | Bricaud .................... 439/733.1 |
| 6,181,219 B1 * | 1/2001 | Gailus et al. .................. 333/33 |
| 6,301,975 B1 | 10/2001 | Chikaraishi |
| 6,328,576 B1 * | 12/2001 | Takahashi ..................... 439/78 |
| 6,330,833 B1 * | 12/2001 | Opie et al. ............. 73/862.333 |
| 6,481,297 B2 * | 11/2002 | Kim et al. ............. 73/862.331 |

FOREIGN PATENT DOCUMENTS

| | | |
|---|---|---|
| JP | 07-135123 | 5/1995 |
| JP | 10-078358 A | 3/1998 |
| JP | 2000-266980 A | 9/2000 |

OTHER PUBLICATIONS

Patent Abstracts of Japan, vol. 1995, No. 8, Sep. 29, 1995, corresponding to JP 07-135123.
Patent Abstracts of Japan, vol. 2000, No. 4, Aug. 31, 2000, corresponding to JP 2000-032708.
Patent Abstracts of Japan, vol. 008, No. 188, Aug. 29, 1984, corresponding to JP 59-077683.

* cited by examiner

*Primary Examiner*—Lesley D. Morris
*Assistant Examiner*—Marlon Arce-Diaz
(74) *Attorney, Agent, or Firm*—Sughrue Mion Pllc.

(57) ABSTRACT

An electric power steering device having a torque sensor for detecting torque by using a coil provided in an electromagnetic yoke. A terminal block projects to the radial outside and axial outside with respect to an axial line of a substantially cylindrical coil bobbin accommodated in the electromagnetic yoke by a predetermined offset amount and is provided in the coil bobbin. The terminal block has press-fitting holes for press-fitting and fixing connection pins for connecting the coil winding and a sensor circuit substrate, wherein the press-fitting holes have air-purging holes communicating with the outside.

3 Claims, 9 Drawing Sheets

FIG.9 *PRIOR ART*
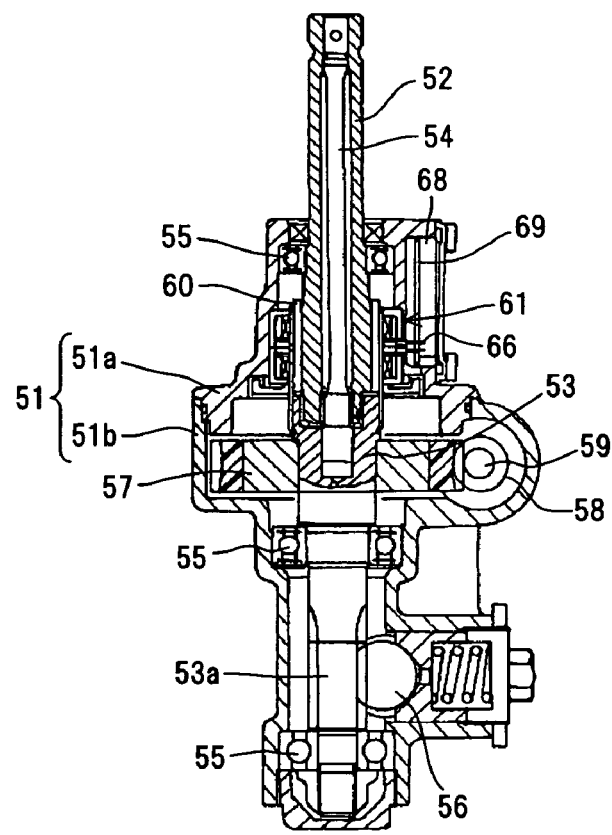
FIG.10 *PRIOR ART*
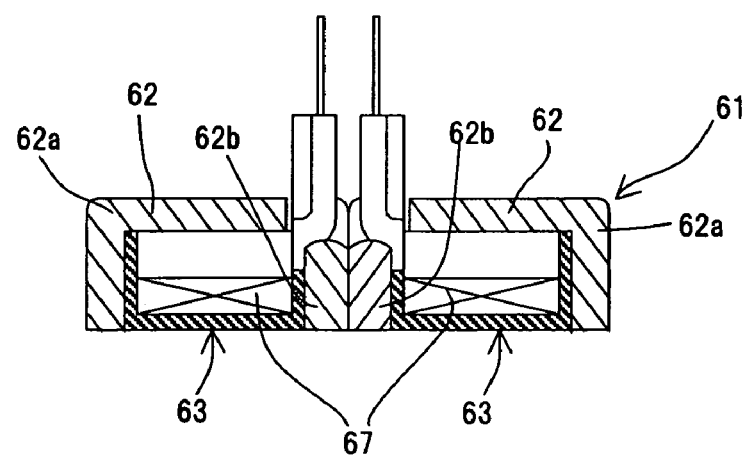

FIG.11 *PRIOR ART*
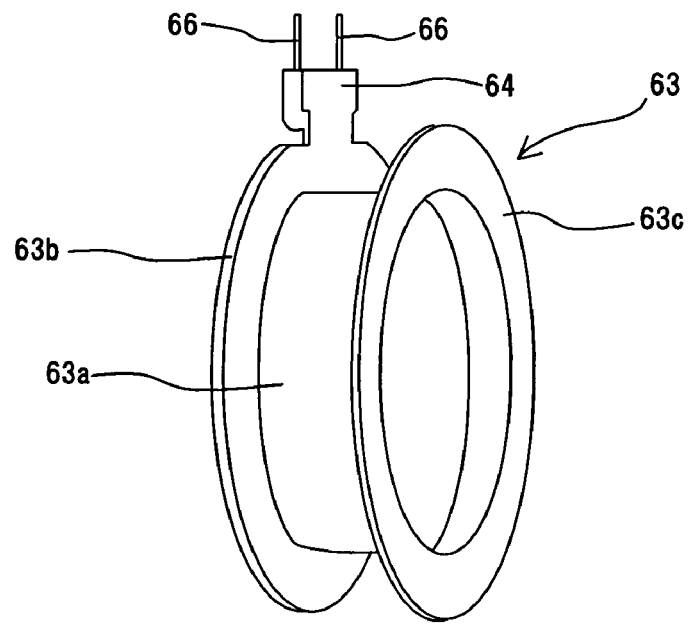
FIG.12 *PRIOR ART*
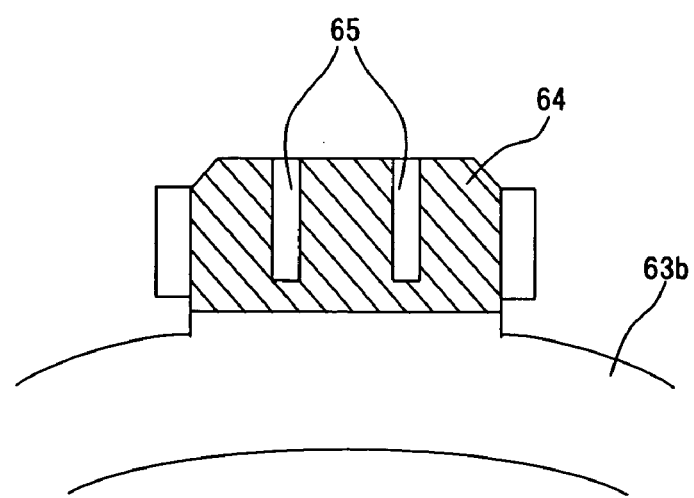

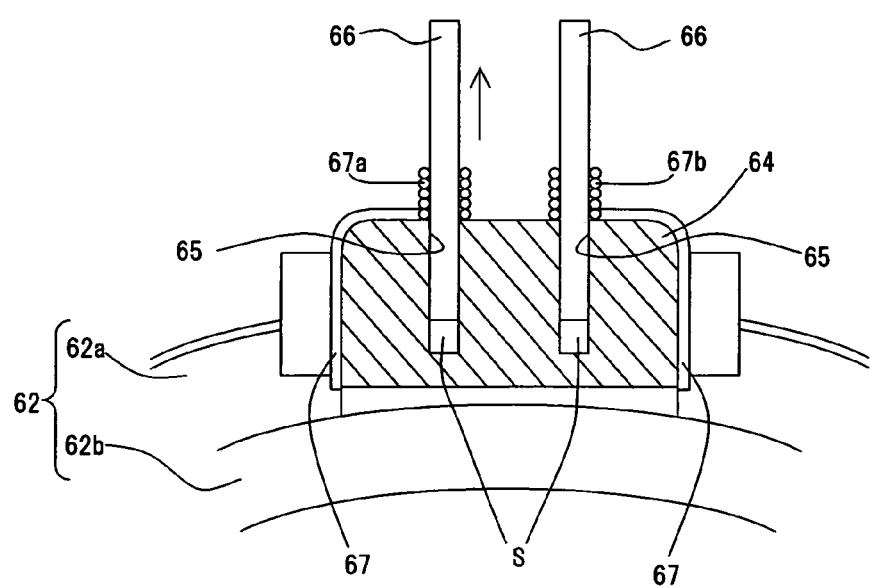
FIG.13 *PRIOR ART*

ELECTRIC POWER STEERING DEVICE

This is a continuation in part of PCT Application No. PCT/JP2003/006306 0filed May 21, 2003; the disclosure of which is incorporated herein by reference. This application also claims the benefit of priority to JP 2002-197994, filed Jul. 5, 2002, upon which the PCT application is based.

TECHNICAL FIELD

The present invention relates to a torque sensor for an electric power steering device for detecting torque occurring at an axis of rotation and, in particular, to a structure for mounting a connection pin for connecting a coil for torque detection and a circuit substrate.

BACKGROUND OF THE INVENTION

Generally, a torque sensor to be used in an electric power steering device is disclosed in JP-A-11-248561, for example. In FIG. 9, in a housing 51 including an upper housing 51a and a lower housing 51b, an input shaft 52 and an output shaft 53 connected through a torsion bar 54 are rotatably supported by bearings 55.

A steering shaft, not shown, for example, is mounted to the upper end of the input shaft 52, and a pinion shaft 53a is integrally provided to the lower end of the output shaft 53. The pinion shaft 53a engages with a rack shaft 56. Notably, a worm wheel 57 is externally fitted into the output shaft 53. The worm wheel 57 co-axially and integrally rotates with the output shaft 53. An output shaft 59 of an electric motor is connected to the output shaft 59 through a worm 58. By transmitting a rotational force of the electric motor to the output shaft 53 through the worm 58 and the worm wheel 57, the electric motor is appropriately controlled and proper steering-assist torque can be given to the output shaft 53.

A cylinder member 60 is provided around the input shaft 52 within the upper housing 51a. A coil unit 61 is mounted on the external side of the cylinder member 60 with a predetermined amount of spacing therebetween. As shown in FIG. 10, the coil unit 61 includes a pair of electromagnetic yokes 62 and coil bobbins 63 accommodated in the electromagnetic yokes 62, respectively. Each of the electromagnetic yokes 62 is a substantially cylindrical member with an inverted C-shaped section having a radial internal part open. The electromagnetic yoke 62 includes a yoke member 62a and a yoke member 62b. The yoke member 62a has an L-shaped section and forms the circumference surface and one side surface. The yoke member 62b forms the other side surface.

As shown in FIG. 11, the coil bobbin 63 is a substantially cylindrical member with an inverted C-shaped section having a radial external part open. The coil bobbin 63 includes injection-molded flanges 63b and 63c of resin at both ends of a cylinder 63a. In the one flange 63b, a substantially parallelepiped terminal block 64 extends to the radial outside and axial outside (that is, the left side of FIG. 11). As shown in FIG. 12, the terminal block 64 has two press-fitting holes 65 and 65 from the top surface to a radially internal part. As shown in FIG. 13, two metal connection pins 66 and 66 are press-fitted and fixed into the press-fitting holes 65, respectively. Edges 67a and 67b of a coil winding 67 wound about the coil bobbin 63 are wound about the connection pins 66 and are fixed along the surface of the terminal block 64. In other words, the connection pins 66 are press-fitted and fixed into the terminal block 64. After that, the leading edge 67a of the coil winding 67 is temporarily fixed by being wound about one of the connection pins 66, and the trailing edge 67b of the coil winding 67 is temporarily fixed by winding it about the other connection pin 66. Then, the wound parts of the connection pins 66 are soaked in a solder bath, and the coil winding 67 is soldered to the connection pins 66. Here, when coats of the edges 67a and 67b of the coil winding 67 are melted by the soldering heat, the coil winding 67 and the connection pins 66 are brought into conduction. The connection pins 66 are fixed at predetermined positions of a circuit substrate 69 within a sensor case 68 of the upper housing 51a.

However, when the connection pins 66 are press-fitted into the press-fitting holes 65 of the terminal block 64, air may be trapped by the connection pins 66 in the deepest area of the press-fitting holes 65. In this case, since the press-fitting holes 65 are not through-holes communicating with the outside, the pressure in an enclosed space s in the area deeper than the pointed ends of the connecting pins 66 increases. Especially, in order to solder the coil winding 67 to the connection pins 66, the connection pins 66 are heated. Thus, the resin of the terminal block 64 is gradually melted, and the temperature in the enclosed space s increases, causing an excessive pressure. As a result, a force from the enclosed space s within the press-fitting holes 65 in the direction indicated by the arrow in FIG. 13 acts on the connection pins 66, and the connection pins 66 may come out from the press-fitting holes 65. Thus, like the connection pins 66, the edges 67a and 67b of the coil winding 67 are pulled in the arrow direction in FIG. 13, causing an excessive stress in the vicinity of the edges of the coil winding 67. Therefore, the edges 67a and 67b of the coil winding 67 may break, and/or exposed parts of the connection pins 66 may become longer than a predetermined size.

Notably, when the press-fitting holes 65 are through-holes through the terminal block 64, the terminal block 64 projects to the axial outside of the coil bobbin 63. Thus, when the connection pins 66 are deeply pushed thereto to press-fit, the connection pins 66 may touch the yoke member 62b of the conductive electromagnetic yoke, that is, the electromagnetic yoke cover, for example, which may cause a short-circuit.

In order to attach the coil unit 61 to the housing 51a, the connection pins 66 are accommodated at a predetermined position in the axial direction of the housing 51a through a substantially-rectangular notch (corresponding to a through-hole 3 in FIG. 1) on a side wall of the housing 51a. In this case, with a low precision of the attachment to the connection pins 66, the connection pins 66 may bend during assembly due to interference with the internal wall of the housing 51a near the notch. Thus, the connection pins 66 cannot be mounted to the circuit substrate 69 precisely, which is a problem.

Accordingly, it is an object of the invention to provide a torque sensor, which can improve the attachment precision of connection pins by improving a structure for mounting the connection pins to a terminal block and securing a connection between coil winding and a circuit substrate by precisely exposing a predetermined length of the connection pins from the terminal block.

SUMMARY OF THE INVENTION

An object of the invention can be achieved by an electric power steering device having a torque sensor for detecting torque by using a coil winding in an electromagnetic yoke, the device characterized in that a terminal block (projecting to a radial outside and axial outside with respect to an axial line of a substantially cylindrical coil bobbin accommodated in the electromagnetic yoke by a predetermined offset amount) is provided in the coil bobbin, the terminal block has press-fitting holes for press-fitting and fixing connection pins connecting the coil winding and a sensor circuit substrate, and the press-fitting holes have air-purging holes communicating with the outside.

An object of the invention can be achieved according to one aspect of the invention by positioning the terminal block on the radial outside of an electromagnetic yoke cover attached to the electromagnetic yoke with respect to the axis line of the coil bobbin.

An object of the invention can be achieved according to another aspect of the invention by providing the air-purging holes in the axial direction of the press-fitting holes from a deepest area of the press-fitting holes and making the air-purging holes smaller in diameter than the press-fitting holes.

An object of the invention can be achieved according to another aspect of the invention by providing the air-purging holes near the deepest area of the press-fitting holes in the direction substantially perpendicular to the axial direction of the press-fitting holes.

An object of the invention can be achieved according to another aspect of the invention by the connection pins having expansion portions at parts to be fitted into the press-fitting holes so that the expansion portions can deform parts of the press-fitting holes to be enlarged when press-fitted.

BRIEF DESCRIPTION OF THE DRAWINGS

The above and other objects, features and advantages of the invention will become more apparent by describing in detail exemplary embodiments thereof with reference to the attached drawings in which:

FIG. 9 is a vertical section view showing a schematic construction of a conventional steering system.

FIG. 10 is a section view showing a state in which a coil bobbin is attached into a conventional electromagnetic yoke.

FIG. 11 is a diagonal view of a conventional coil bobbin.

FIG. 12 is a section view of a terminal block having conventional press-fitting holes.

FIG. 13 is a section view showing connection pins attached into the conventional press-fitting holes.

DESCRIPTION OF THE REFERENCE NUMERALS

1 Torque Sensor
2 Housing
3 Through-Hole
4 Coil Unit
5 Coil Bobbin
6 Electromagnetic Yoke
7 Electromagnetic Yoke Cover
8 Cylinder
9 Flange
10 Coil Winding
12 Terminal block
13 Press-Fitting hole
14 Connection Pin
15 Air-Purging Hole
16 Expansion Portion

DETAILED DESCRIPTION OF THE PREFERRED ILLUSTRATIVE NON-LIMITING EMBODIMENTS

Exemplary embodiments of the invention will now be described below by reference to attached Figures. The described exemplary embodiments are intended to assist the understanding of the invention, and are not intended to limit the scope of the invention in any way.

Figure 1:
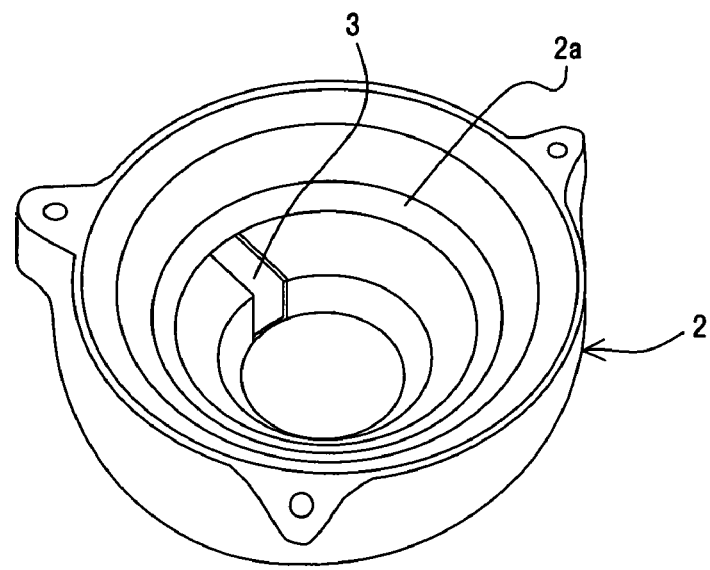
FIG. 1 is an upper diagonal view of a housing of a torque sensor according to an exemplary embodiment the invention.
Figure 2:
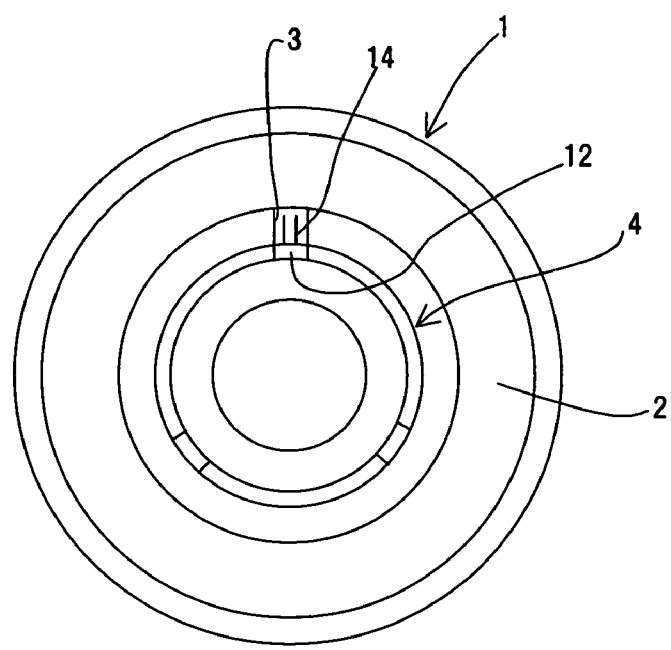
FIG. 2 is a plan view of the housing having the coil unit attached.

FIGS. 1 to 5 show a first exemplary embodiment of the invention. FIG. 1 is a perspective diagram showing an appearance of a housing 2 of a torque sensor 1. A side wall 2a of the substantially cylindrical housing 2 has a through-hole 3, which is a substantially rectangular notch. FIG. 2 is a plan view showing a coil unit 4 attached in the center of the housing 2.

Figure 3:
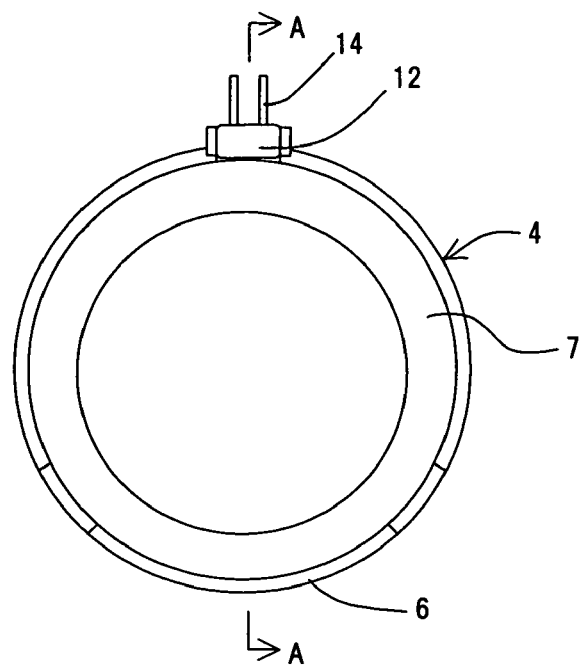
FIG. 3 is a plan view showing a state in which a coil bobbin is attached into an electromagnetic yoke and a terminal block is provided in the coil bobbin.
Figure 4:
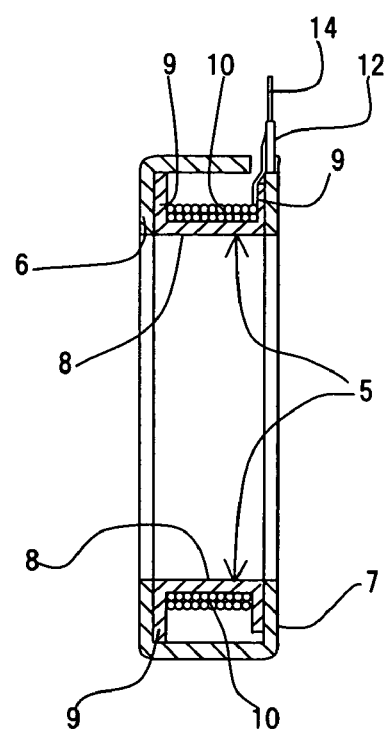
FIG. 4 is a section view taken at the line A-A in FIG. 3.

As shown in FIGS. 3 and 4, in the coil unit 4, a coil bobbin 5 of a synthetic resin is accommodated in an electromagnetic yoke 6. A disk-shaped electromagnetic yoke cover 7 is integrally press-fitted into the electromagnetic yoke 6. The electromagnetic yoke 6 is a substantially cylindrical member, and the coil bobbin 5 is a member having an inverted-C-shaped section with the radial outer side open. The coil bobbin 5 has flanges 9 and 9 at both ends of a cylinder 8. As shown in FIG. 4, a coil winding 10 is provided within the coil bobbin 5 circumferentially.

Figure 5:
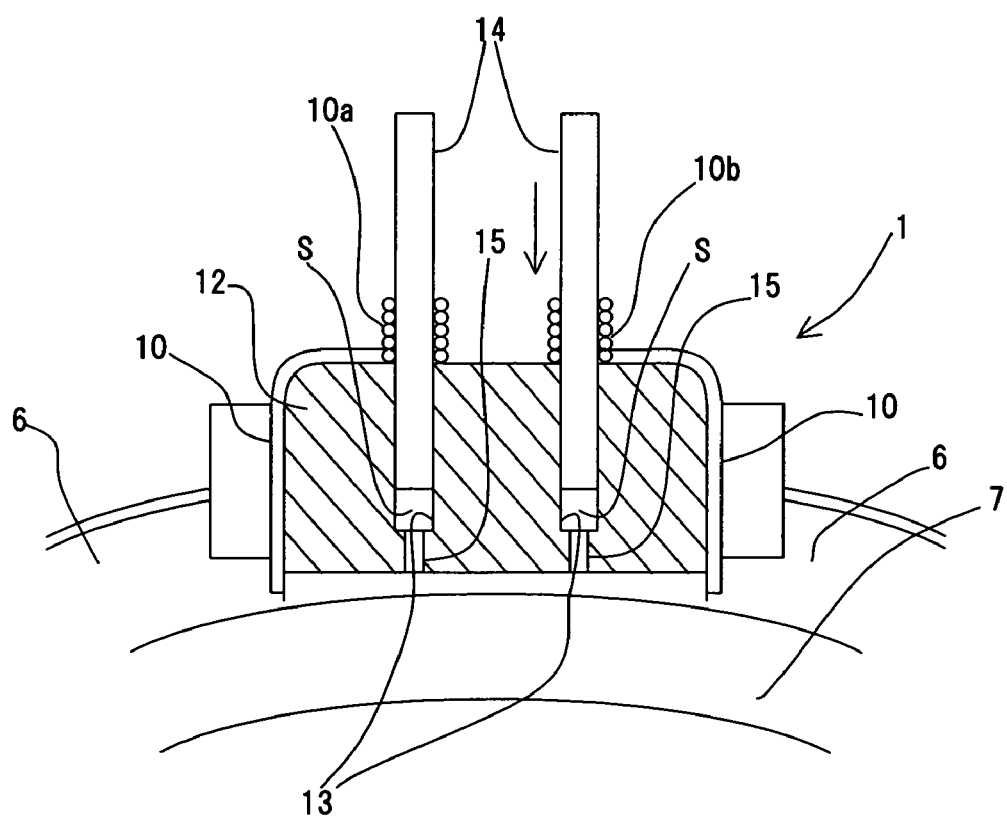
FIG. 5 is a view of a first exemplary embodiment in which a press-fitting hole has an air-purging hole in the press-fitting direction.

As shown in FIG. 3, the coil bobbin has a substantially parallelepiped terminal block 12 projecting by a predetermined offset amount to the radial outside and axial outside with respect to the axis line of the coil bobbin. The terminal block 12 is integrally injection-molded with a resin during the molding of the coil bobbin 5. As shown in FIG. 5, the terminal block 12 has two radially (vertically in FIG. 5) extending press-fitting holes 13, 13. Stick-shaped connection pins 14 are to be press-fitted into the press-fitting holes 13 in the direction of the arrow in FIG. 5. Each of the connection pins 14 is formed by plating an iron material with copper and tin.

Each of the press-fitting holes 13 has an air-purging hole 15 communicating with the outside from the deepest area of the press-fitting hole 13 to the bottom of FIG. 5. The air-purging hole 15 has a smaller diameter than the press-fitting hole 13 and connection pin 14. The air-purging hole 15 can keep the pressure in the press-fitting hole 13 substantially equal to that of the outside.

Next, a method of attaching the connection pins 14 to the terminal block 12 and providing continuity between the connection pins 14 and a coil winding will be described. When the connection pins 14 are press-fitted into the press-fitting holes 13 in the terminal block 12 in the direction of the arrow in FIG. 5, pressure increases in a space s in the deepest area of each of the press-fitting holes 13 as the connection pin 14 is being press-fitted thereinto. Since the increased amount of pressure is purged from the air-purging hole 15 to the outside, substantially constant pressure can be maintained in the space s in the press-fitting hole 13. When the connection pins 14 reach predetermined positions, ends 10a and 10b of the coil winding 10 are laid over the surface of the terminal block 12 from the side surface to the upper surface and are wound about the connection pins 14. After that, the exposed part of the connection pins 14 are soaked in a solder bath, and a coat of the coil winding 10 is melted by the soldering heat. Thus, continuity is provided between the connection pins 14 and the coil winding 10. In this case, since the connection pins 14 contain a highly heat-conductive iron material, the temperature in the space s within the press-fitting hole 13 increases instantly through the connection pins 14 and the terminal block 12, and the pressure also increases therein. However, the increased pressure can be purged to the outside through the air-purging hole 15.

Therefore, according to the first exemplary embodiment, even when the pressure is increased by the connection pins 14 in the space s within the press-fitting holes 13, the increased pressure can be purged to the outside through the air-purging hole 15. Thus, constant pressure can be maintained in the space s. Then, the connection pins 14 are not pushed up from the press-fitting holes 13 and do not come out. Therefore, the connection pins 14 can be held rigidly at predetermined positions, and a length of exposed parts thereof from the terminal block 12 can be kept at a predetermined length. As a result, the connection pins 14 can be prevented from increasing the length of the exposed parts and bending due to the interference with the side wall 2a when attached to the housing 2. Furthermore, the connection pins 14 are prevented from being pressed deeply, which can secure the connection with the circuit substrate. Since the diameter of the air-purging hole 15 is smaller than that of the connection pin 14, the connection pins 14 can be prevented from projecting from the terminal block 12, touching the electromagnetic yoke cover 7 and causing a short-circuit therebetween.

Furthermore, since the air-purging holes 15, which have smaller diameters than the press-fitting holes 13 and the connection pins 14, are provided in the deepest area of the press-fitting holes 13, a rapid increase in press-fit force occurs when connection pins 14, which are longer than a predetermined length, are mixed and are press-fitted thereto. Thus, an abnormality can be detected. Here, an increased pressure due to the air compression can be purged through the air-purging holes 15. Thus, by controlling press-fit forces properly, when an abnormality in press-fit force by the connection pins 14 is detected, the corresponding product can be weeded out as a defective piece. Here, when a connection pin 14 being shorter than a predetermined length is mixed in, a press-fit force becomes abnormally small. Thus, the short connection pin 14 can be weeded out as a defective part. Therefore, the existence of the air-purging holes 15 allows the easy and accurate press-fit force control of the connection pins 14.

Therefore, the precision of the attachment of the connection pins 14 can be improved, and the coil winding 10 and the circuit substrate can be securely connected.

Figure 6:
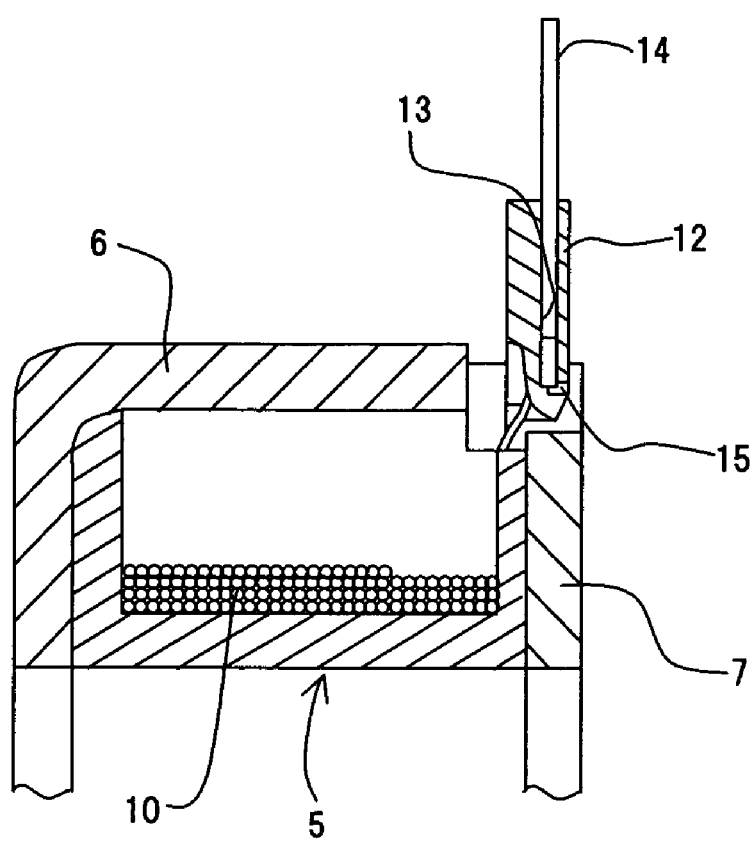
FIG. 6 is a view showing a second exemplary embodiment in which a press-fitting hole has an air-purging hole in the direction perpendicular to the press-fitting direction.

FIG. 6 shows a second exemplary embodiment of the invention. Here, the same reference numerals are given to the same components as those of the first exemplary embodiment, and the description of several similar parts will be omitted. In FIG. 6, the air-purging holes 15 extend to the outside (that is, the right side of FIG. 6) in the direction substantially perpendicular to the axial direction of the press-fitting holes 13 from the deepest area of the press-fitting holes 13. Also in this case, because of the air-purging holes 15, an increased pressure caused by the press-fitting of the connection pins 14 can be purged to the outside. Therefore, also according to the second exemplary embodiment, the same functions and advantages as those of the first exemplary embodiment can be obtained.

Furthermore, in the second exemplary embodiment, the press-fitting holes 13 are blind holes in the press-fitting direction. Thus, the projection of the connection pins 14 to the electromagnetic yoke cover 7 side can be prevented more effectively, and a short-circuit can be prevented.

Figure 7:
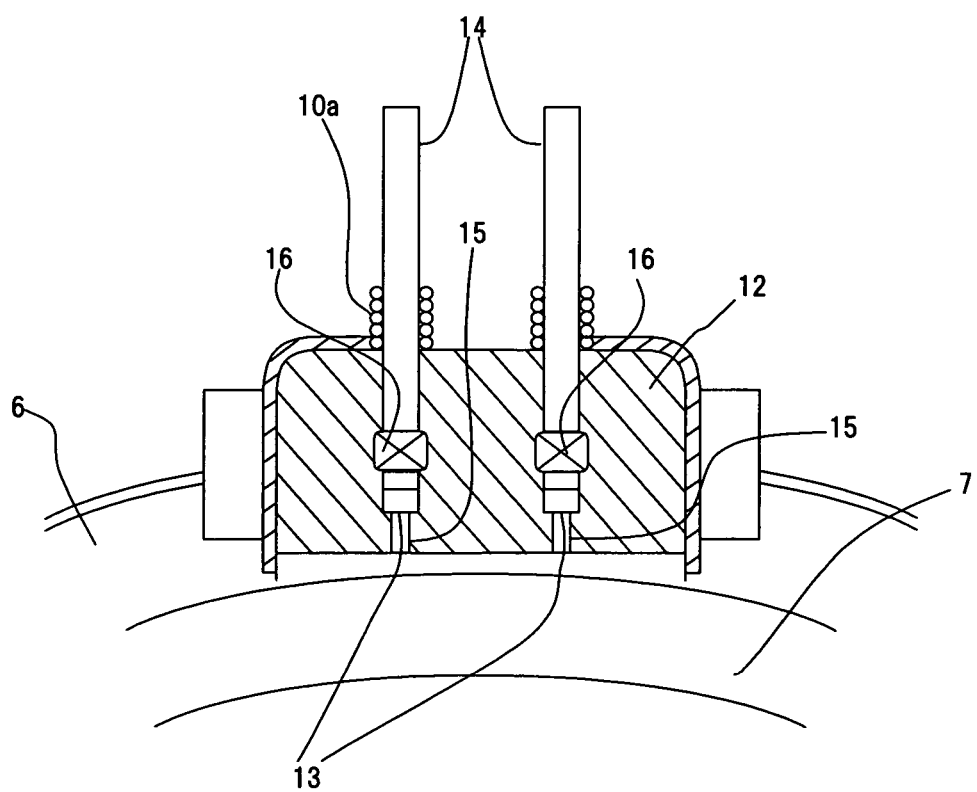
FIG. 7 is a view of a third exemplary embodiment corresponding to the first exemplary embodiment in which a connection pin having a deformed part as an expansion portion is provided.
Figure 8:
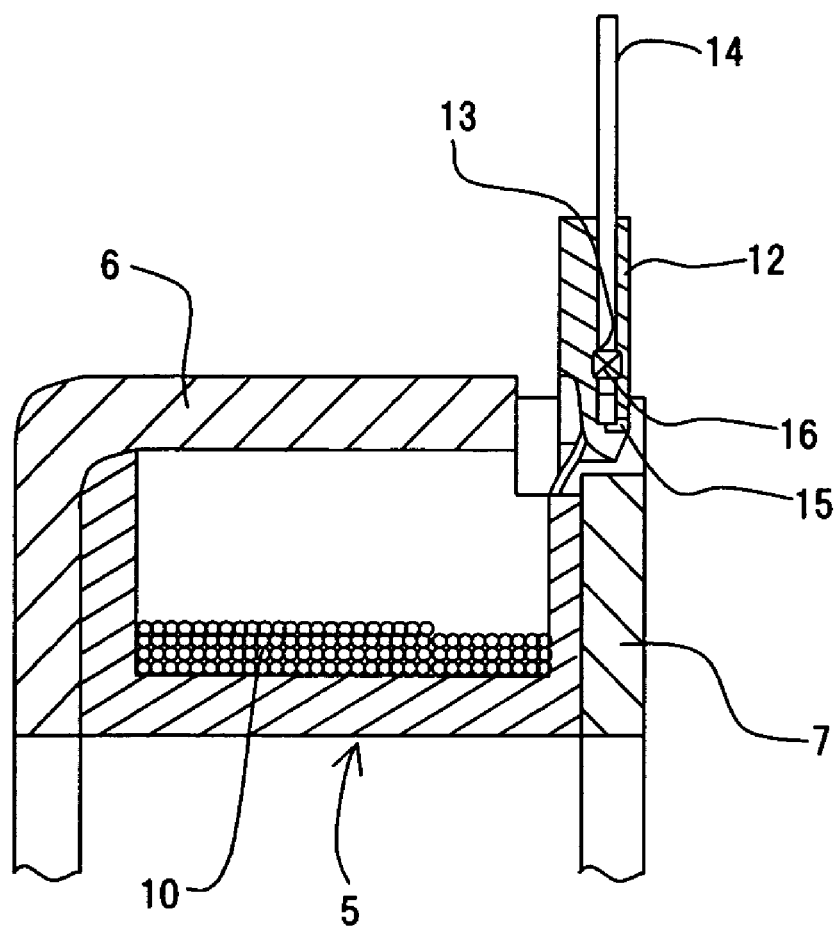
FIG. 8 is a view of a fourth exemplary embodiment corresponding to the second exemplary embodiment in which a connection pin having a deformed part as an expansion portion is provided.

FIGS. 7 and 8 show third and fourth exemplary embodiments of the invention and are similar to FIGS. 5 and 6, respectively. According to the third and fourth exemplary embodiments, the press-fitting holes 13 have air-purging holes 15 communicating with the outside. Thus, the same functions and advantages as those of the first and second exemplary embodiments can be obtained.

Furthermore, the connection pins 14 have expansion portions 16 resulting from the deformation of a part of each of the connection pins 14 by flat pressing. The expansion portions 16 are press-fitted into the press-fitting holes 13. Thus, when the connection pins 14 are press-fitted into the press-fitting holes 13, the connection pins 14 are rigidly engaged to the press-fitting holes 13 by the expansion portions 16 of the connection pins 14. Therefore, the holding power of the connection pins 14 can be advantageously improved.

As described above, in the torque sensor 1 of the electric power steering device according to an exemplary embodiment of the invention, the terminal block 12 projecting to the radial outside and axial outside with respect to the axis line of the coil bobbin 5 by a predetermined offset amount is provided to the coil bobbin 5 within the electromagnetic yoke 6. Furthermore, the terminal block 12 has the press-fitting holes 13 for press-fitting and fixing the connection pins 14 connecting the coil winding 10 and the sensor circuit substrate. The press-fitting holes 13 have air-purging holes 15 communicating with the outside. Thus, even when the connection pins 14 are press-fitted into the press-fitting holes 13 or when an end of the coil winding 10 is soldered to the connection pins 14 and when a temperature and/or pressure in the press-fitting holes 13 instantly increase, the increased pressure and/or expanded air can be purged to the outside through the air purging holes 15. Therefore, the connection pins 14 do not come out even when pushed up from the press-fitting holes 13, and the exposed parts of the connection pins 14 can be precisely maintained at a predetermined length. Hence, when the coil unit 4 is attached, the connection pins 14 do not bend due to the interference with a housing internal wall through the through-holes 3. As a result, the precision of the attachment of the connection pin 14 to the terminal block 12 can be improved, and the connection pins 14 can securely connect the coil winding 10 and a circuit substrate in a sensor case. Furthermore, since the air-purging holes 15 have smaller diameters than the connection pins 14, the connection pins 14 are prevented from projecting to the electromagnetic yoke cover 7 side, touching thereto and causing a short-circuit.

While the invention has been particularly shown and described with reference to exemplary embodiments thereof, the invention is not limited to these embodiments. It will be understood by those of ordinary skill in the art that various changes in form and details may be made therein without departing from the broad spirit and scope of the present invention as defined by the following claims.

What is claimed is:

1. An electric power steering device having a torque sensor for detecting torque by using a coil winding in an electromagnetic yoke, the device comprising:
   a terminal block projecting radially with respect to an axial line of a substantially cylindrical coil bobbin; said coil bobbin being accommodated in the electromagnetic yoke by a predetermined offset amount, and
   said terminal block being positioned radially outside of an electromagnetic yoke cover to be attached to the electromagnetic yoke, the terminal block including press-fitting holes for press-fitting and fixing connection pins, wherein the press-fitting holes include air-purging holes communicating with the outside,
   said connection pins projecting radially with respect to the axial line and connecting the coil winding and a sensor circuit substrate, wherein the connection pins are fixed at the predetermined portions of the sensor circuit substrate, and
   the air-purging holes are provided near a deepest area of the press-fitting holes in a direction substantially perpendicular to an axial direction of the press-fitting holes.

2. An electric power steering device according to claim 1 wherein the connection pins include expansion portions at a part to be fitted into the press-fitting holes.

3. An electric power steering device according to claim 2 wherein expansion portions can deform part of the press-fitting holes.

* * * * *